(12) United States Patent
DeRosia et al.

(10) Patent No.: US 8,893,226 B1
(45) Date of Patent: *Nov. 18, 2014

(54) SYSTEM AND METHOD FOR PROVIDING INTERNET ACCESS SERVICES AT HOTELS WITHIN A HOTEL CHAIN

(75) Inventors: Darrell DeRosia, Cordova, TN (US); Robert Stroud, Olive Branch, MS (US)

(73) Assignee: HLT Domestic IP LLC, McLean, VA (US)

(*) Notice: Subject to any disclaimer, the term of this patent is extended or adjusted under 35 U.S.C. 154(b) by 81 days.

This patent is subject to a terminal disclaimer.

(21) Appl. No.: 13/585,401

(22) Filed: Aug. 14, 2012

Related U.S. Application Data

(63) Continuation of application No. 12/483,888, filed on Jun. 12, 2009, now Pat. No. 8,245,276.

(60) Provisional application No. 61/060,926, filed on Jun. 12, 2008.

(51) Int. Cl.
*G06F 17/30* (2006.01)

(52) U.S. Cl.
USPC .................................. 726/2; 726/7; 709/229

(58) Field of Classification Search
USPC .......................................... 726/2, 7; 709/229
See application file for complete search history.

(56) References Cited

U.S. PATENT DOCUMENTS

| 6,636,894 | B1 | 10/2003 | Short et al. | |
|---|---|---|---|---|
| 6,996,073 | B2 | 2/2006 | West et al. | |
| 8,245,276 | B1* | 8/2012 | DeRosia et al. | 726/2 |
| 2001/0037383 | A1 | 11/2001 | Sabal | |
| 2001/0054101 | A1 | 12/2001 | Wilson | |
| 2003/0028611 | A1 | 2/2003 | Kenny et al. | |
| 2003/0067911 | A1 | 4/2003 | Kikinis | |
| 2003/0105643 | A1 | 6/2003 | Chen et al. | |
| 2003/0140345 | A1 | 7/2003 | Fisk et al. | |
| 2004/0083128 | A1 | 4/2004 | Buckingham et al. | |
| 2004/0111520 | A1* | 6/2004 | Krantz et al. | 709/229 |
| 2006/0031436 | A1 | 2/2006 | Sakata et al. | |
| 2007/0143486 | A1 | 6/2007 | Kang et al. | |
| 2008/0215381 | A1 | 9/2008 | Reiter | |
| 2013/0209108 | A1* | 8/2013 | Krishnakumar et al. | 398/130 |
| 2013/0297723 | A1* | 11/2013 | Iwaniszyn | 709/217 |
| 2013/0347073 | A1* | 12/2013 | Bryksa et al. | 726/4 |

FOREIGN PATENT DOCUMENTS

GB 2411329 8/2005

* cited by examiner

*Primary Examiner* — Krisna Lim
(74) *Attorney, Agent, or Firm* — Standley Law Group LLP

(57) ABSTRACT

An improved system and method for providing Internet access services to guests of a hotel chain. A web services (WS) framework is used for communications between a central authentication server (CAS) and property management system (PMS) of a hotel within a chain. Authentication of a user to a high speed Internet network is accomplished using the WS framework to facilitate communication between the CAS and PMS. A gateway device for authentication is bypassed and transactions are posted by implementing a WS interface between a CAS and PMS at each hotel. Additional transactions may be incorporated within the WS interface thereby increasing the system and method's ability to deliver significant improvements in customer service to the hotel guest. Reduced dependence upon a gateway device to facilitate communications allows a hotel to implement a high speed Internet access program with a degree of independence from one particular vendor.

20 Claims, 3 Drawing Sheets

SYSTEM AND METHOD FOR PROVIDING INTERNET ACCESS SERVICES AT HOTELS WITHIN A HOTEL CHAIN

CROSS-REFERENCE TO RELATED APPLICATIONS

This application claims priority to U.S. Provisional Patent Application Ser. No. 61/060,926, filed Jun. 12, 2008, titled SYSTEM AND METHOD FOR PROVIDING INTERNET ACCESS SERVICES AT HOTELS WITHIN A HOTEL CHAIN, and to U.S. patent application Ser. No. 12/483,888, which claims priority to U.S. Provisional Application Ser. No. 61/060,926, filed Jun. 12, 2009, titled SYSTEM AND METHOD FOR PROVIDING INTERNET ACCESS SERVICES AT HOTELS WITHIN A HOTEL CHAIN, now U.S. Pat. No. 8,245,276, issued Aug. 14, 2012, all of which are incorporated herein by reference.

FIELD OF THE INVENTION

The present invention is directed to systems and methods for providing Internet access services at a hotel. In particular, the present invention is directed to a web services (WS) framework used for communications between a central authentication server (CAS) and property management system (PMS) of a hotel within a chain to provide Internet access services.

BACKGROUND OF THE INVENTION

Guests of many hotels today consider Internet access to be more than an amenity. Business travelers often use the Internet to complete work assignments as well as to communicate with their home offices. They may also use it to communicate with their family members back home. Leisure travelers also frequently use Internet access services while staying at a hotel. They may use the Internet to plan daily activities or to stay in contact with business colleagues as well as other family members not participating in the vacation. Many guests further use the Internet for entertainment during their hotel stay such as for accessing online games or downloading videos and music. For all guests, the availability of Internet access service, and in particular high-speed Internet access service, is an important consideration when selecting a hotel. The availability of fast and reliable Internet access service can influence their decision to select one hotel over another.

In addition to expecting fast and reliable service, hotel guests further want an Internet access service that is convenient and easy-to-use. Guests need to be able to connect quickly to the Internet without the need to modify or reconfigure their computers to establish the connection or without the need to create and maintain different user accounts that support access to the Internet. Methods for accessing an Internet connection, however, can vary depending upon the type of network or service used by the hotel to facilitate such connections. Connection methods can vary not only across hotels' brands that are part of the same chain, but even across hotels of the same brand because of differences in the Internet access service offered by each individual hotel. In particular, authentication services may vary based on hotel or even a location within a hotel (e.g., wireless hot spot or hotel guest room).

For many hotel guests, part of an Internet access service that is convenient and easy-to-use includes convenience when paying for Internet access services. Because Internet access service is considered just one of the many services that a hotel may offer, guests expect to be able to use and pay for the service in the same manner they use and pay for other hotel services such as room service, entertainment services, or health club services. They should be able to place an order for the service and then pay for it using one of several payment methods such as adding the service to a room bill or charging it to a credit card.

Although hotel guests today have specific expectations about the Internet access services, meeting those expectations can be difficult. Many hotels use a property management system (PMS) to manage reservations, billing, and guest profiles as well as other accounting and property management functions for one or more hotels. A separate authentication server is used to verify the identity of users requesting access to the Internet service. Finally, the actual Internet connection is established through various devices and computers located through the hotel. FIG. 1 is an example prior art system for providing hotel guests with Internet access. A hotel guest 100 establishes an Internet connection 102 through a hotel access point to an authentication server 104. Communications between the authentication server 104 and PMS 108 for the hotel are routed through an Internet gateway device 106 at the hotel. Each Internet gateway device as well as related software may have been developed by different vendors or even by the same vendor but at different times. Therefore, there may be a multitude of communication interfaces or incompatibilities with respect to each gateway device that must be accommodated to permit communication between the authentication server 104 and PMS 108.

Although different systems are designed to provide specific features and functionality, the manner in which systems are interconnected and communicate with each other can have an impact on the Internet access service for hotel guests. For example, using an Internet gateway device to route communications between an authentication server and PMS can impact the service in several ways, especially when the gateway devices are purchased from different vendors. Each gateway device vendor may use different communication methods that when updated, require updates to each system that communicates through the gateway device. Certain authentication server or PMS updates may cause the need for updates on each gateway device. The use of gateway devices may increase the development effort required to provide the access services. Furthermore, gateway devices are often limited in power and memory and therefore, have limited ability to provide data or to manage unusual situations. The type of communications links that are commonly used to connect to gateway devices further limit capabilities related to providing Internet access to hotel guests.

The limitations of the gateway devices that are deployed as well as the connections can prompt numerous calls to customer service in which guests request assistance with authentication issues such as name miss-matches or posting problems in which charges are posted twice or not at all. The interdependence between systems can cause further problems. Most PMSs operate in a mode known as "night audit." If information from the PMS that is otherwise needed to support Internet access is not available because the PMS is in night audit, another option for providing access is required. It may be necessary for a customer support representative to manually open a port to provide a guest with access to the Internet. In large hotels where the night audit process runs for several hours, support phone calls attributable to night audit lock out may represent as much as 25% of the total calls for the hotel per day.

Problems that compromise the guest experience such as interface inconsistencies or delays in accessing the service can be reduced by implementing a solution that allows for more customization and control over the software services provided by the devices in the network. Providing seamless Internet access services within a single hotel as well as across hotels within a brand or a chain requires communication and cooperation between the authentication and PMS systems that ordinarily provide unrelated features and functionality. Integrating an Internet access services network that comprises devices installed and maintained throughout each hotel with the PMS so that guests can access and pay for services in the same manner they purchase other services requires communication and cooperation between the PMS, authentication, and Internet gateway device systems. There is a need for a seamless Internet access service across hotels that does not require guests to modify or reconfigure their computers to establish connections or to create and maintain different user accounts that support access to the Internet, especially across hotels that are part of the same chain. There is a need for an Internet access service across hotels that allows guests to connect easily and quickly to the Internet and that supports various billing options. There is a need for an improved system and method for providing Internet access services to guests of a hotel chain.

SUMMARY OF THE INVENTION

The present invention is an improved system and method for providing Internet access services to guests of a hotel chain. In an example embodiment of the invention, a web services (WS) framework is used for communications between an authentication server and PMS of a hotel within a chain. Authentication of a user to a high speed Internet network is accomplished using the WS framework to facilitate communication between the centralized authentication server and the PMS (or similar point-of-sale and/or accounting system). A gateway device for authentication is bypassed and transactions are posted by implementing a WS interface between a centralized authentication server and the PMS at each hotel. Additional transactions may be incorporated within this WS interface thereby increasing the system's ability to deliver significant improvements in customer service to the hotel guest.

In an example embodiment of the invention, an Internet based TCP/IP connection is made between two points. A service request is made and a response with a schema follows. This approach allows the centralized authentication server to interact with the guest, the PMS, and the gateway device. Reducing dependence upon the gateway device to facilitate communications allows a hotel to implement a high speed Internet access program with a degree of independence from one particular vendor and positions a hotel chain to take advantage of new products and developments within a much shorter time frame. More importantly, it allows the hotel chain to manage the speed at which changes in the Internet access program are made to take advantage of new opportunities as they occur.

The configuration of components and related communications in the WS framework provides a more dependable means of authenticating the hotel guest, improves the message flow—both in speed and reliability—between the centralized authentication server and PMS, allows a smooth and consistent guest experience even when the PMS is in night audit lock down mode, improves revenue capture by improving the charge posting transaction, and serves as a platform for future enhancements that could further improve the customer experience.

DETAILED DESCRIPTION

Figure 1:
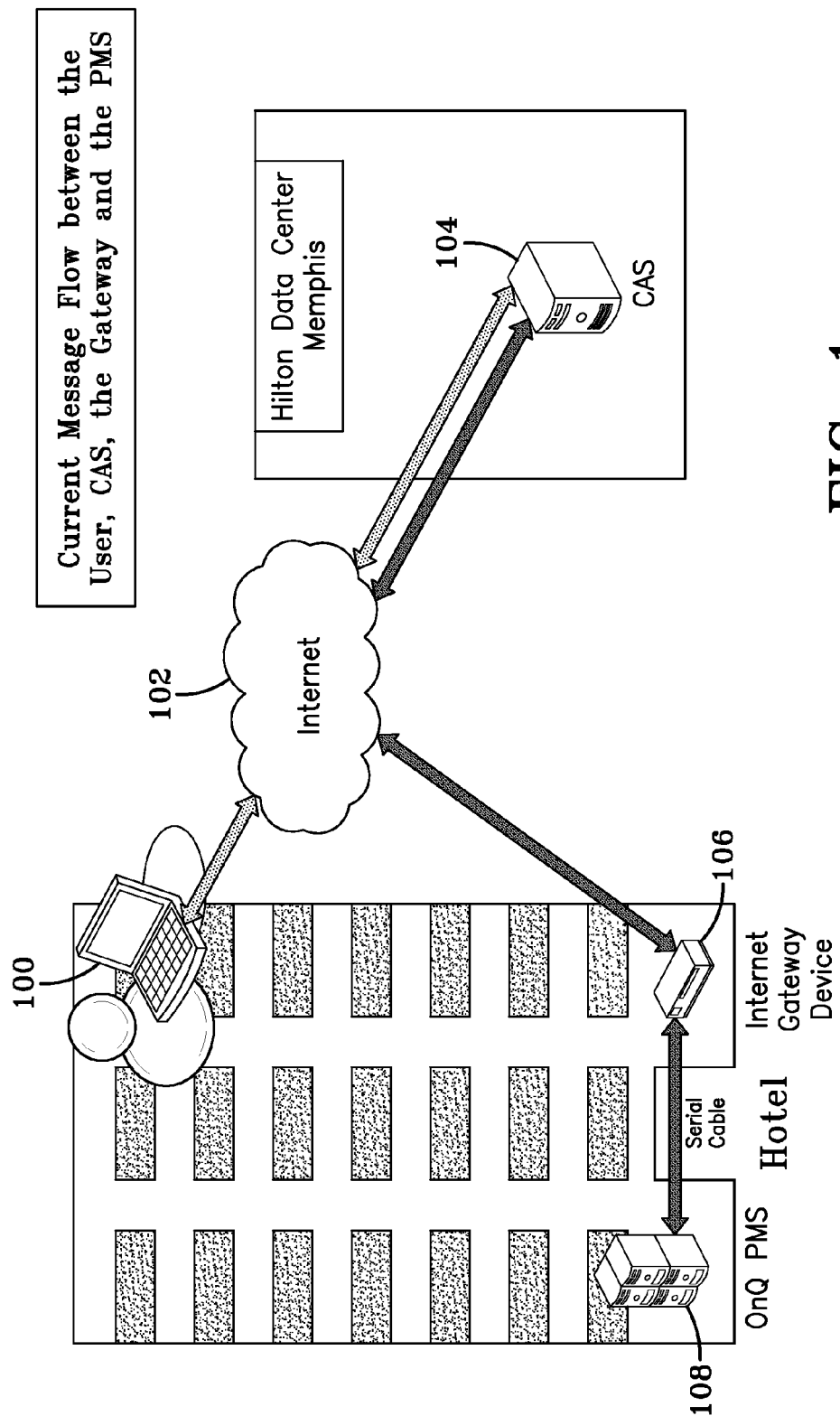
FIG. 1 is an example prior art system for providing hotel guests with Internet access.
Figure 2:
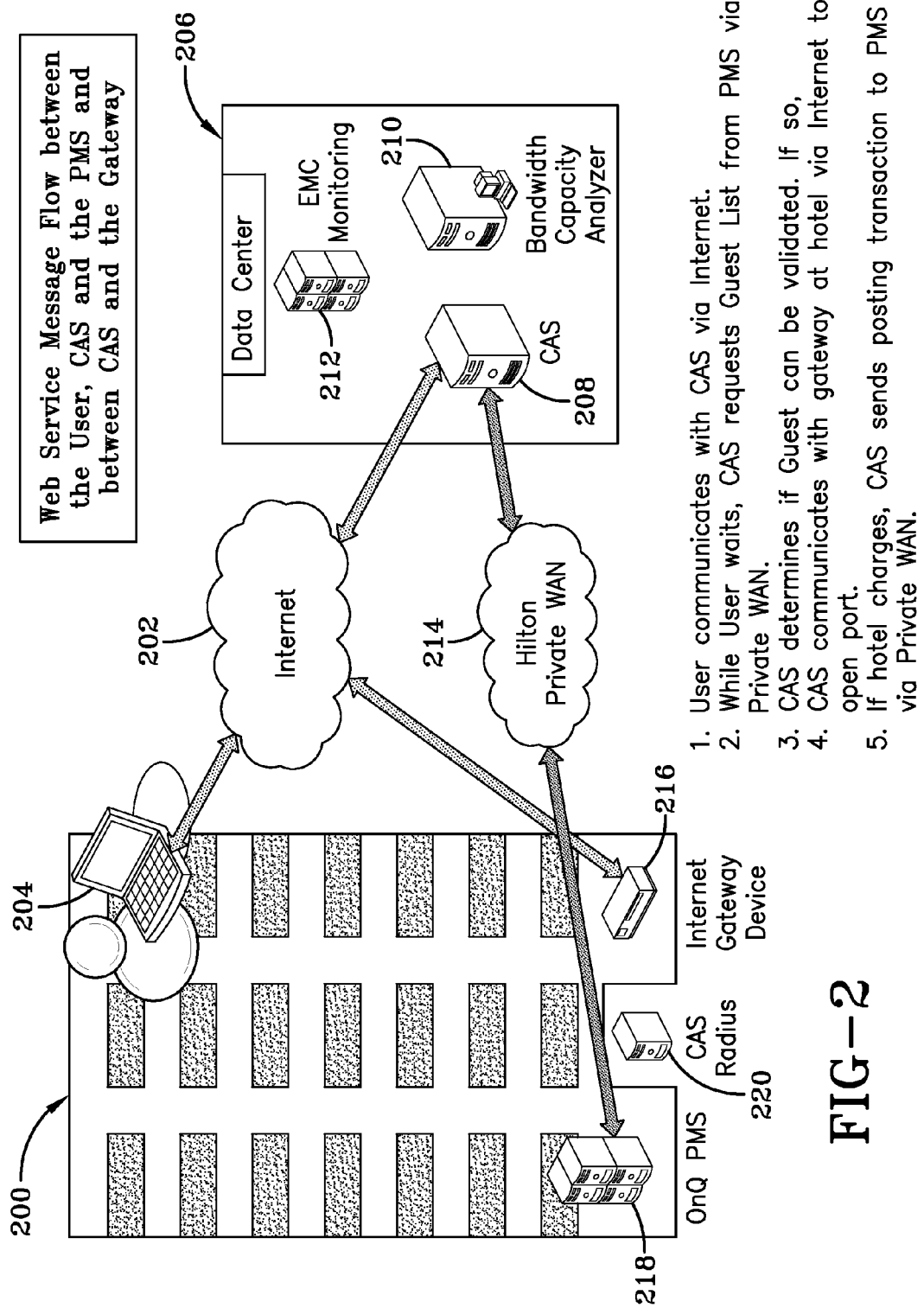
FIG. 2 is a system for providing high speed Internet access (HSIA) services to guests of a hotel chain according to an example embodiment of the present invention.

Referring to FIG. 2, a system for providing high speed Internet access (HSIA) services to guests of a hotel chain according to an example embodiment of the present invention is shown. In this example embodiment, a web services (WS) framework is deployed to facilitate communications between a centralized authentication server (CAS) 208 (and other devices such as a bandwidth capacity analyzer 210 and EMC monitoring 212) at a data center 206 and devices at a hotel 200, namely an Internet gateway device 216 and a property management system (PMS) 218. These devices all serve roles in the delivery of HSIA services to hotel guests.

CAS 208 provides an initial HTML splash screen that the hotel guest 204 sees when requesting Internet access. This screen provides input areas for the guest to enter the information necessary to prove that he/she is a guest of the hotel or to provide other means of paying for HSIA access in hotels offering guests with a bill-to-guest option. Additionally, CAS 208 may provide a variety of package and meeting room management functions, support functions, and various administrative capabilities. In an example embodiment of the present invention, the CAS is a RADIUS (Remote Authentication Dial-In User Service) server 220.

The Internet gateway device 216 manages NATd (network address translation) IPs, provides DHCP (dynamic host configuration protocol) and opens and closes ports allowing hotel guests to access to the Internet 202. The gateway device 216 also manages time allotments, such as several hours worth of access, three days of access, etc. The gateway device may communicate with the PMS via an RS-232 cable or similar type of link.

When a guest checks into a hotel, identifying information for the guest such as the guest's first and last name is entered into the PMS. Identifying information may be received from other sources such as reservation systems. Once the guest is checked into the hotel, additional identifying information such as the guest's room number is added to the data stored in the PMS. The guest identifying data such as last name, first name, and room number facilitates confirming the guest's registration status when Internet access services are requested.

The PMS 218 provides guest identifying data for guests such as a list of guest names in a specific room number and receives posting transactions from the gateway device 216 via a messaging interface. It also provides HSIA reporting from CAS 208. The PMS 218 and data center CAS 208 are connected via a private WAN 214.

A CAS RADIUS 220 at each hotel 200 provides user accounting, reporting, and protocol management for a large number of users with distinct authentication information and further facilitates centralized user administration through the CAS 208. It processes users for adds and deletes in the CAS application continuously throughout the day as user authentication information changes. The IP address is the gateway device 216 with a translation table that states which user name and password of RADIUS is assigned to the guest.

Session level information includes:

TABLE 1

| User | Number of users |
|---|---|
| Length of Time | |
| Bandwidth/Data Consumption | Up and down traffic |
| Start and Stop Time of the Session | |
| Maximum Number of Concurrent Users | |
| Time of Day Used for Maximum Users | |
| Address Type | Did user choose session level upsell - private or public? |

Session level information is associated with users via MAC address, IP Address, and hotel overall information (what information as a whole or grouping level of data: a whole hotel; VLAN information tied to devices; all wireless users; all DSL users; where are the users connecting in the hotel (access point, DSL line in room, etc.)). The CAS 208 further provides intelligence and reporting such as the providing small scale reporting for business level users by hotel with the ability to define time parameters (e.g., length of time—date range with time of day) and the items listed in Table 1.

In addition, wired to wireless roaming may be supported such that the guest may use a connected device for both a wired and wireless connection. The feature may be supported by using cookies on the guest's computer. LDAP logins may also be supported such that user information (i.e., name or number and passwords) from a hotel loyalty program is made available to the CAS 208 and used for login to the Internet.

Web service transactions supported by the WS framework of the present invention may include the following.

Transaction 1—Validate Guest Last Name, First Name and Room Number

CAS 208 provides a screen to the guest in which the guest enters information that allows CAS 208 and the PMS 218 to validate the user's guest status and determine if the user is really a registered guest in the hotel. Guest input may comprise information such as the guest's first name, last name, and room number. There are two methods for determining a guest's registration status. In the first method, the PMS may perform a name matching and room validation function and simply return an accept or reject indicator to the CAS 208. Transaction details are as follows:

TABLE 2

| | Validation Transaction |
|---|---|
| Request Suggested fields for input: | Transaction ID (unique) Guest Last Name Guest First Name Room Number Package Indicator (Optional) - package length in number of days Date/Time (Transaction sent) |
| Response Returned from the PMS: | Transaction ID (returns same Transaction ID as received in the Request) Name Match Validation Indicator - Boolean Guest Last Name Guest First Name Room Number Folio Indicator - folio ID for guest's charges (assumes PMS determine which folio to post HSIA charges) Departure Date (optional) Date/Time (Transaction sent) |

The second method, which allows for fuzzy logic, assumes that CAS 208 issues a request for guest name information from the PMS 218 and the PMS 218 returns a list of names for the requested room. CAS then performs the required name matching and validation routines. Transaction details are as follows:

TABLE 3

| | Validation Transaction using Fuzzy Logic |
|---|---|
| Request Suggested fields for input: | Transaction ID (unique) Room Number Date/Time (Transaction sent) |
| Response Returned from the PMS: | Transaction ID (unique) Room Number List All Guest Names Registered to Room Number    Guest Last Name    Guest First Name    Charge Indicator - Boolean (OK to charge to room)    Folio Indicator - folio ID for this guest's charges    Incidentals Indicator - Optional    (Folio Number if incidentals    are to be charged to a different folio.) Date/Time (Transaction sent) |

Transaction 2—Post Transaction for the PMS

The posting transaction notifies the PMS 218 to charge a HSIA charge to the guest's folio. This transaction is performed if Transaction 1 has been initiated and the response indicates that posting is approved for the appropriate guest. Transaction 1 may return a unique approval code for posting use to facilitate this transaction. Transaction details are as follows:

TABLE 4

| | Post Transaction |
|---|---|
| Request Suggested fields for input: | Transaction ID (unique) Room Number Folio ID Charge Amount Description for Folio Date/Time (Transaction sent) |
| Response Returned from the PMS: | Transaction ID (returns same Transaction ID as received in the Request) Room Number Folio ID Charge Amount Completion Code - Success or Failure Code Date/Time (Transaction sent) |

Transaction 3—Status for Night Audit

This transaction is a status request from CAS 208 to the PMS 218 requesting a night audit status response. This transaction is useful when CAS 208 is attempting to authenticate a guest at a time when the PMS 218 is in a night audit state. If the PMS 218 indicates that night audit is in process (via a positive response) and that no postings can occur, CAS 208 opens a port for the guest to access the Internet and queues the actual authentication and posting transaction (if appropriate) until such time as the PMS 218 responds to night audit status requests with a negative response. CAS 208 may maintain an authentication and posting queue and poll the PMS 218 at appropriate intervals.

TABLE 5

Night Audit Transaction

| | |
|---|---|
| Request | Transaction ID (unique) |
| Suggested fields for input: | IsInNightAudit - Property Code - either 5 or 7 character CTYHO or CTYHOCN |
| | Date/Time (Transaction sent) |
| Response Returned from the PMS: | Transaction ID (returns same Transaction ID as received in the Request) |
| | Room Number |
| | Folio ID |
| | Charge Amount |
| | Completion Code - Success or Failure Code |
| | Date/Time (Transaction sent) |

Transaction 4—Occupancy for Bandwidth Rate Limiting

This transaction determines the potential HSIA usage within the hotel and the data contained within the response to assist CAS 208 in determining the minimal bandwidth rates to set for each guest. Transaction details are as follows.

TABLE 6

Bandwidth Allocation Transaction

| | |
|---|---|
| Request | Transaction ID (unique) |
| Suggested fields for input: | OccupancyDate - today or future date |
| | Date/Time (Transaction sent) |
| Response Returned from the PMS: | Transaction ID (returns same Transaction ID as received in the Request) |
| | OccupancyDate - today or future date |
| | Current Rooms Occupied - number (based on OccupancyDate field) |
| | Due Out - number (based on OccupancyDate field) |
| | Check-Ins - number (based on OccupancyDate field) |
| | Out Of Service Rooms - number (based on OccupancyDate field) |
| | Date/Time (Transaction sent) |

CAS 208 uses this data and other data to determine how many potential HSIA guests will demand bandwidth during a particular period of time. The frequency of this transaction increases as occupancy increases or as other data indicates capacities are nearing maximums. Other data CAS 208 may use is WAN bandwidth utilization data from the EMC monitoring engine 210.

To communicate using the WS framework, CAS 208 determines the IP address of the PMS server 218 at each hotel 200 in the chain in order to transact services. A port to guest room mapping in CAS 208 supports the web services. When a port is opened for a guest, the guest user is added at the same time to the gateway device.

Figure 3:
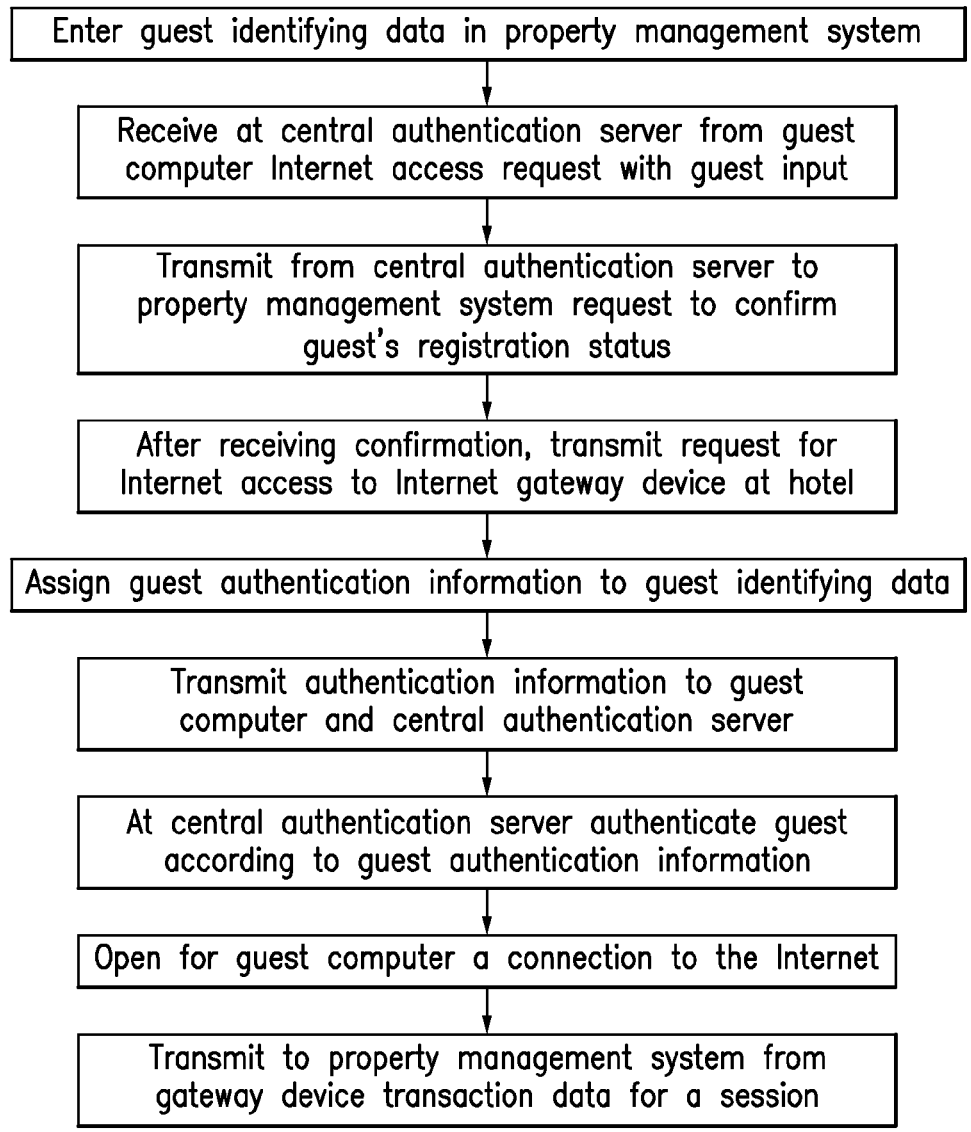
FIG. 3 is a flowchart of a method for providing Internet access services to hotel guests according to an example embodiment.

Referring to FIG. 3, a flowchart of a method for providing Internet access services to hotel guests according to an example embodiment is shown. As indicated in the flowchart, communications between a central authentication server and property management server occur to confirm a guest's registration status prior to initiating an Internet connection through a gateway.

While certain embodiments of the present invention are described in detail above, the scope of the invention is not to be considered limited by such disclosure, and modifications are possible without departing from the spirit of the invention as evidenced by the following claims:

The invention claimed is:

1. A computerized method for providing Internet access services to guests of a hotel comprising:
    (a) receiving at a central authentication server from a guest computer in said hotel an Internet access request, said Internet access request comprising guest identifying data for confirming said guest's registration status;
    (b) transmitting from said central authentication server to a hotel property management system a guest registration request to confirm said guest's registration status at said hotel using said guest identifying data;
    (c) receiving at said central authentication server from said hotel property management system confirmation data for said guest's registration status at said hotel;
    (d) authenticating at said central authentication server said guest computer according to guest authentication data from said guest computer; and
    (e) transmitting from said central authentication server to an internet gateway in said hotel a request to open a port for said guest computer.

2. The computerized method of claim 1 wherein said confirmation data for said guest's registration status at said hotel comprises a registration indicator.

3. The computerized method of claim 2 wherein said registration indicator is selected from the group consisting of an accept indicator and a reject indicator.

4. The computerized method of claim 1 wherein said guest registration request comprises a request for guest name information.

5. The computerized method of claim 4 wherein said confirmation data comprises a name list for a requested room.

6. The computerized method of claim 5 further comprising: executing at said central authentication server a matching routine to locate said guest identifying data in said name list.

7. The computerized method of claim 1 wherein said guest identifying data comprises said guest's last name, said guest's first name, and said guest's room number.

8. The computerized method of claim 1 further comprising transmitting from said central authentication server to said hotel property management system a request to charge said Internet access request to said guest's folio.

9. A computerized method for providing Internet access services to guests of a hotel comprising:
    (a) receiving at a central authentication server from a guest computer in said hotel an Internet access request, said Internet access request comprising guest identifying data for confirming said guest's registration status;
    (b) transmitting from said central authentication server to a hotel property management system a night audit status request;
    (c) receiving at said central authentication server from said hotel property management system confirmation of a night audit in process;
    (d) transmitting from said central authentication server to an internet gateway in said hotel a request to open a port for said guest computer; and
    (e) queuing at said central authentication server a guest registration request.

10. The computerized method of claim 9 further comprising:
    (f) transmitting from said central authentication server to said hotel property management system a night audit status request;
    (g) receiving at said central authentication server from said hotel property management system confirmation of a night audit not in process; and
    (h) transmitting from said central authentication server to said hotel property management system a guest registration request.

11. The computerized method of claim 10 wherein said guest registration request comprises a request for a registration indicator.

12. The computerized method of claim 11 wherein said registration indicator is selected from the group consisting of an accept indicator and a reject indicator.

13. The computerized method of claim 10 wherein said guest registration request comprises a request for guest name information.

14. The computerized method of claim 13 further comprising receiving at said central authentication server from said hotel property management system a name list for a requested room.

15. The computerized method of claim 14 further comprising:
   executing at said central authentication server a matching routine to locate said guest identifying data in said name list.

16. The computerized method of claim 9 further comprising transmitting from said central authentication server to said property management system a request to charge said Internet access request to said guest's folio.

17. A system for providing Internet access services to guests of a hotel comprising:
   (a) a hotel property management system sever executing instructions to:
      (1) receive guest identifying data for a guest in said hotel;
      (2) receive from a central authentication server guest registration requests to confirm guest registration;
   (b) a central authentication server servicing a plurality of hotels executing instructions to:
      (1) receive from a guest computer in said hotel an Internet access request comprising guest identifying data;
      (2) transmit to said hotel property management system server a guest registration request to confirm said guest's registration status at said hotel using said guest identifying data;
      (3) receive from said hotel property management system server confirmation data for said guest's registration status at said hotel; and
      (4) transmit to an Internet gateway device said Internet access request comprising said guest identifying data; and
   (c) an Internet gateway device at said hotel executing instructions to:
      (1) receive from said central authentication server said Internet access request comprising said guest identifying data and guest authentication information;
      (2) open for said guest computer an Internet connection at said hotel; and
      (3) transmit to said hotel property management system server transaction data for a session using said Internet connection.

18. The computerized system of claim 17 wherein said confirmation data for said guest's registration status at said hotel comprises an accept indicator or a reject indicator.

19. The computerized system of claim 17 wherein said central authentication server further executes instructions to:
   (5) transmit from said central authentication server to said hotel property management system for said hotel a night audit status request;
   (6) receive at said central authentication server from said hotel property management system confirmation of a night audit in process; and
   (7) queue at said central authentication server a guest registration request.

20. The computerized system of claim 19 wherein said central authentication server further executes instructions to:
   (8) transmit from said central authentication server to said hotel property management system for said hotel a night audit status request;
   (9) receive at said central authentication server from said hotel property management system confirmation of a night audit not in process; and
   (10) transmit from said central authentication server to said hotel property management system a guest registration request.

* * * * *